United States Patent
Wilhelmsson et al.

(10) Patent No.: US 12,307,903 B2
(45) Date of Patent: May 20, 2025

(54) UNMANNED AIRCRAFT SYSTEM, A CONTROL SYSTEM OF A MARINE VESSEL AND A METHOD FOR CONTROLLING A NAVIGATION SYSTEM OF A MARINE VESSEL

(71) Applicant: Volvo Penta Corporation, Gothenburg (SE)

(72) Inventors: Denny Wilhelmsson, Jonsered (SE); Cassandra Köbbel, Öckerö (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 245 days.

(21) Appl. No.: 17/450,784

(22) Filed: Oct. 13, 2021

(65) Prior Publication Data

US 2022/0122465 A1   Apr. 21, 2022

(30) Foreign Application Priority Data

Oct. 15, 2020   (EP) .................................... 20202012

(51) Int. Cl.
| | |
|---|---|
| *G08G 3/00* | (2006.01) |
| *B63B 49/00* | (2006.01) |
| *B64U 10/14* | (2023.01) |
| *B64U 20/87* | (2023.01) |
| *B64U 101/20* | (2023.01) |
| *B64U 101/30* | (2023.01) |
| *G06T 7/60* | (2017.01) |

(Continued)

(52) U.S. Cl.
CPC ............... *G08G 3/00* (2013.01); *B63B 49/00* (2013.01); *B64U 10/14* (2023.01); *B64U 20/87* (2023.01); *G06T 7/60* (2013.01); *G06T 7/70* (2017.01); *H04W 4/46* (2018.02); *B64U 2101/20* (2023.01); *B64U 2101/30* (2023.01); *B64U 2201/20* (2023.01); *G06T 2207/10012* (2013.01)

(58) Field of Classification Search
CPC ........................................................ G08G 3/00
See application file for complete search history.

(56) References Cited

U.S. PATENT DOCUMENTS

| | | | |
|---|---|---|---|
| 10,165,722 B2 * | 1/2019 | Ackerman | ............. G05D 1/024 |
| 11,769,321 B2 * | 9/2023 | Kozuka | ................. G08G 1/166 |
| | | | 706/25 |

(Continued)

FOREIGN PATENT DOCUMENTS

| | | |
|---|---|---|
| CN | 106005264 A | 10/2016 |
| CN | 108470470 A | 8/2018 |

(Continued)

OTHER PUBLICATIONS

European Search Report dated Apr. 8, 2021 in corresponding European Patent Application No. 20202012.9, 9 pages.

(Continued)

*Primary Examiner* — Jean Paul Cass
(74) *Attorney, Agent, or Firm* — Venable LLP; Jeffri A. Kaminski

(57) ABSTRACT

An unmanned aircraft system of an unmanned aircraft, a control system arranged on a marine vessel, as well as a method for controlling a navigation system of a marine vessel is described. This may enable improved operation of the marine vessel in docking situations at a mooring position.

11 Claims, 3 Drawing Sheets

(51) Int. Cl.
*G06T 7/70* (2017.01)
*H04W 4/46* (2018.01)

(56) References Cited

U.S. PATENT DOCUMENTS

| | | | |
|---|---|---|---|
| 2016/0157414 A1* | 6/2016 | Ackerman | A01B 69/008 |
| | | | 701/25 |
| 2016/0267435 A1* | 9/2016 | Eid | G08G 3/00 |
| 2016/0340006 A1 | 11/2016 | Tang | |
| 2017/0220879 A1* | 8/2017 | Nakamura | H04N 23/61 |
| 2018/0275649 A1 | 9/2018 | Harnett et al. | |
| 2019/0014760 A1 | 1/2019 | Twining et al. | |
| 2020/0202115 A1 | 6/2020 | Kindaichi et al. | |
| 2021/0371064 A1* | 12/2021 | Boks | B63B 49/00 |
| 2022/0127014 A1* | 4/2022 | Cowden | B64F 1/007 |
| 2022/0172464 A1* | 6/2022 | Ross | G06V 20/10 |
| 2022/0392211 A1* | 12/2022 | Johnson | G06V 10/26 |
| 2022/0404839 A1* | 12/2022 | Tzukerman | G05D 1/0684 |
| 2023/0103359 A1* | 4/2023 | Rivers | G05D 1/0044 |
| | | | 701/2 |

FOREIGN PATENT DOCUMENTS

| | | | | |
|---|---|---|---|---|
| CN | 208284101 U | | 12/2018 | |
| CN | 109360385 A | | 2/2019 | |
| CN | 110177741 A | | 8/2019 | |
| CN | 110831851 A | | 2/2020 | |
| EP | 3639105 A1 | | 4/2020 | |
| EP | 3647829 A1 | | 5/2020 | |
| EP | 3985644 A1 | * | 4/2022 | B63B 49/00 |
| JP | S63158498 U | * | 10/1988 | |
| JP | 2011007085 A | | 1/2011 | |
| JP | 2020102257 A | | 7/2020 | |
| KR | 20170049893 A | * | 10/2015 | |
| KR | 20160062286 | * | 6/2016 | |
| KR | 20170133010 A | | 12/2017 | |
| WO | 2015171346 A1 | | 11/2015 | |
| WO | 2018130795 A1 | | 7/2018 | |
| WO | 2018232447 A1 | | 12/2018 | |
| WO | WO-2018232376 A1 | * | 12/2018 | B63B 49/00 |
| WO | 2019197606 A1 | | 10/2019 | |

OTHER PUBLICATIONS

Chinese Office Action dated May 27, 2023 in corresponding Chinese Patent Application No. 202111175435.6, 17 pages.
Chinese Office Action dated Jan. 10, 2024 in corresponding Chinese Patent Application No. 202111175435.6, 25 pages.
Chinese Notice of Grant dated Apr. 11, 2024 in corresponding Chinese Patent Application No. 202111175435.6, 8 pages.
European Communication pursuant to Article 94(3) EPC dated Feb. 25, 2025 in corresponding European Patent Application No. 20202012. 9, 4 pages.

* cited by examiner

UNMANNED AIRCRAFT SYSTEM, A CONTROL SYSTEM OF A MARINE VESSEL AND A METHOD FOR CONTROLLING A NAVIGATION SYSTEM OF A MARINE VESSEL

TECHNICAL FIELD

The present disclosure relates to an unmanned aircraft system of an unmanned aircraft, a control system arranged on a marine vessel, as well as a method for controlling a navigation system of a marine vessel.

BACKGROUND

At present, marine vessels conventionally utilizes GPS systems or other suitable navigation systems to operate at sea. Hereby, the navigation system can guide the operator of the marine vessel to its final destination as well as to warn the operator to avoid steering the marine vessel at shallow water, etc.

However, when the marine vessel arrives at a harbor or port for docking, there is often a problem to be able to find suitable mooring position. At the harbor/port, there are often a lot of other boats and/or ships present. These boats/ships are of different size and it could be difficult to properly navigate between them in the rather hectic environment. As such, there is a problem at a harbor/port to find a suitable mooring position for docking.

SUMMARY

It is therefore an object of the present disclosure to at least partially overcome the above described deficiencies for a marine vessel at docking situations.

According to a first aspect, there is provided an unmanned aircraft system of an unmanned aircraft, the unmanned aircraft system comprising an aircraft controller comprising an aircraft receiver and an aircraft transmitter, the aircraft transmitter being configured to transmit wireless signals to a receiver of a control system of a marine vessel, wherein the unmanned aircraft system further comprises an image capturing system connected to the aircraft controller, the aircraft controller being configured to receive an image signal from the image capturing unit, the image signal being indicative of a mooring position for the marine vessel; and transmit a signal indicative of dimensions of an area of the mooring position to the control system of the marine vessel.

The wording "mooring position" should be construed as a docking area for the marine vessel having length and/or width dimensions, where at least one of the length or width can be limiting, depending on the mooring position in relation to space limiting obstacles. Accordingly, the wording "dimensions of an area" should be construed as a length, a width and/or the entire area of the mooring position. Thus, the mooring position is an area for marine vessels to dock. The transmitted signal thus serves as an indication of the area of the mooring position for determining if its dimensions are suitable for the specific marine vessel. As described above, the signal is indicative of the area. This should be construed such that the aircraft controller can determine the specific area by itself, or transmit the image to the receiver of the control system of the marine vessel. In the latter case, the control system of the marine vessel will determine/calculate the area of the mooring position.

An advantage of the present disclosure is that the unmanned aircraft system can quickly scan suitable mooring positions for docking the marine vessel, and the marine vessel does not need to enter a perhaps crowded harbor where stressful situations easily can occur. As the aircraft controller is in constant communication with the control system of the marine vessel, the operator, or autonomously controlled steering system, can be provided with instant data of mooring positions in the vicinity of the marine vessel. Also, the operator, or autonomously controlled steering system, can quickly disregard mooring positions which are not suited for the specific marine vessel dimensions. Hereby, docking the marine vessel will be improved as the time period for finding a suitable mooring position is reduced.

According to an example embodiment, the aircraft controller may be further configured to determine, based on the image signal, the dimensions of the area of the mooring position at sea level. Thus, as indicated above, the aircraft controller determines the dimensions of the area of the mooring position. Hereby, the control system of the marine vessel receives the dimensions directly and need not carry out any computational calculations. The dimensions of the mooring position can be rapidly provided to the operator of the marine vessel. Also, and according to an example embodiment, the signal may be indicative of a geographical position of the mooring position. Hence, the geographical position at e.g. the harbor such that the marine vessel can be guided to this geographical position if its dimensions are suitable for the specific marine vessel dimensions. The geographical position can preferably be the coordinates of the mooring position.

According to an example embodiment, the aircraft controller may determine the area at sea level based on a reference image captured by the image capturing unit, the reference image comprises predefined dimensions.

Preferably, the aircraft controller comprises an elevation sensor, or other similar system for determining the current elevation above sea level. The aircraft controller preferably also comprises an accelerometer/gyro as well as a positioning system. The positioning system is preferably a GPS or equivalent.

Hereby, the dimensions/area of the mooring position, although it is positioned at a rather far distance from the unmanned aircraft, can be determined with high accuracy.

According to an example embodiment, the unmanned aircraft system may be further configured to control the unmanned aircraft to image scan a predefined area based on a signal received from the control system of the marine vessel; and identify potential mooring positions at the predefined area.

The predefined area preferably forms part of a harbor/port, or preferably is the entire harbor/port.

According to an example embodiment, the image capturing unit may be a stereo-vision camera. Other alternatives are also conceivable, such a combination of vision camera and laser for performing measurements by the image capturing unit. As another alternative, a CCD-camera may be used. The skilled person understands that other types of image capturing units are conceivable.

According to an example embodiment, the unmanned aircraft may be a drone. A drone is particularly useful as it can rather easily be controlled from the marine vessel and can quickly scan the surroundings of the marine vessel.

According to a second aspect, there is provided a control system arranged on a marine vessel, the control system being connectable to a marine vessel navigation system of the marine vessel and comprises a transmitter and a receiver, the receiver being configured to receive wireless signals from an aircraft transmitter of an unmanned aircraft system, the control system being configured to obtain a signal from the unmanned aircraft system, the signal being indicative of dimensions of an area at sea level of a mooring position for the marine vessel; compare the dimensions of the area with marine vessel specific dimensions; and control the marine vessel navigation system to dock the marine vessel at the mooring position when the dimensions of the area of the mooring position is larger than the dimension of the marine vessel.

Hereby, and as indicated above, the marine vessel can quickly be controlled to dock at a suitable mooring position.

The wording "marine vessel specific dimensions" should be construed as a length, width and/or area of the specific marine vessel. The marine vessel may be controlled by an operator, i.e. manually controlled, or autonomously controlled.

According to an example embodiment, the control system may be further configured to control the marine vessel navigation system to autonomously dock the marine vessel at the mooring position when the dimensions of the area of the mooring position is larger than the dimension of the marine vessel.

Hereby, an autopilot of the marine vessel can guide the marine vessel to the mooring position and dock the marine vessel. This is advantageous in cases of relatively unexperienced operators when docking at tight mooring positions, i.e. where the dimensions of the area of the mooring position is substantially the same as the marine vessel specific dimensions.

According to an example embodiment, the marine navigation system may be arranged to guide the marine vessel to dock at the mooring position when the marine vessel is within a predetermined distance from the mooring position.

According to an example embodiment, the marine navigation system may be arranged to dock the marine vessel when the marine vessel is within the predetermined distance from the mooring position.

Hereby, the marine navigation system can "take over" the steering operation when the marine vessel is arranged relatively close to the mooring position.

According to an example embodiment, the marine navigation system may be arranged to guide an operator of the marine vessel in a direction towards the mooring position when the marine vessel is outside the predetermined distance from the mooring position. Thus, a mere indication of a suitable mooring position is presented for the operator. The operator can, based on the indication, take a decision to choose the selected mooring position or instruct the unmanned aircraft to scan for an alternative mooring position.

According to an example embodiment, the control system may be further configured to transmit navigation signals to the unmanned aircraft system, the navigation signals being indicative of a desirable navigation of the unmanned aircraft system. An advantage is thus that navigation of the unmanned aircraft can be controlled from the marine vessel.

Further effects and features of the second aspect are largely analogous to those described above in relation to the first aspect.

Based on the above description of the first and second aspects, the present disclosure thus relates to a navigation system. The navigation system comprises an unmanned aircraft system according to the above described first aspect and a control system according to the above described second aspect.

According to a third aspect, there is provided a method for controlling a navigation system of a marine vessel, the navigation system being wirelessly connected to an unmanned aircraft system comprising an image capturing system, the method comprising obtaining an image signal from an image capturing unit of an unmanned aircraft, the image signal being indicative of dimensions of an area at sea level of a mooring position for the marine vessel; comparing the dimensions of the area at sea level with marine vessel specific dimensions; and controlling the navigation system to dock the marine vessel at the mooring position when the dimensions of the area of the mooring position is larger than the dimension of the marine vessel.

The step of comparing the dimensions of the area with marine vessel specific dimensions may be executed by either the unmanned aircraft system or by the control system arranged on the marine vessel.

Further effects and features of the third aspect are largely analogous to those described above in relation to the first and second aspects.

According to a fourth aspect, there is provided a computer readable medium carrying a computer program comprising program code means for performing the steps of the third aspect when the program means is run on a computer.

According to a fifth aspect, there is provided a computer program comprising program code means for performing the steps of the third aspect when the program is run on a computer.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
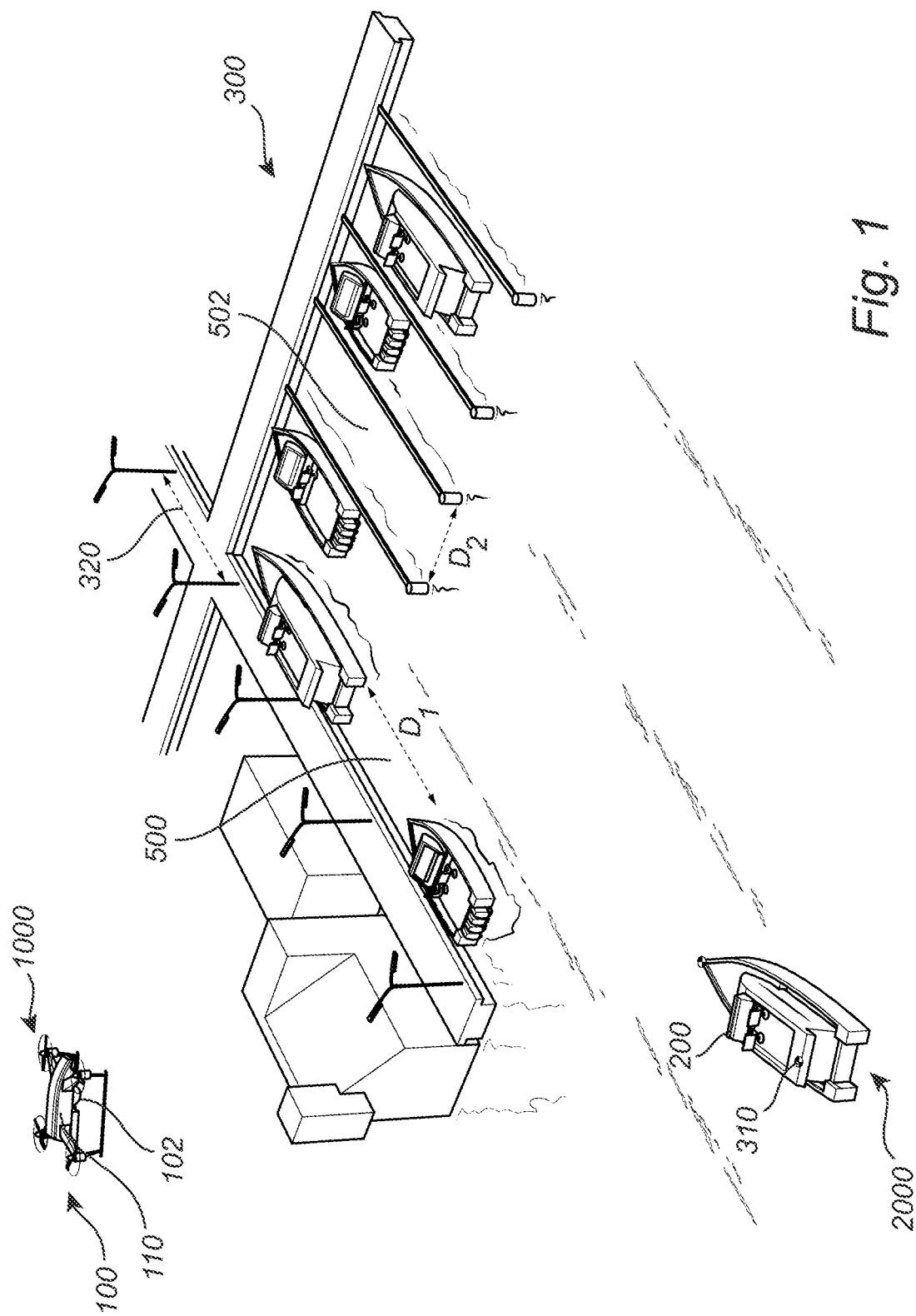
FIG. 1 is a perspective view illustrating a marine vessel and an unmanned aircraft according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a marine vessel 2000 steering into a marina 300 for docking. The marine vessel 2000 is provided with an unmanned aircraft 1000, in the following also referred to as a drone. In particular, a control system 200 of a marine vessel 2000 (illustrated in further detail in FIG. 2) operates the drone to circulate around the marina 300 to identify the current situation at the marina 300. Thus, when the marine vessel 2000 arrives at the marina, an operator of the marine vessel 2000 can initiate operation of the drone to scan the marina environment. Thus, the control system 200 may be arranged to transmit navigation signals to the drone for scanning from above a particular area in the vicinity of the marine vessel.

The unmanned aircraft 1000 may, according to an example embodiment, belong to the marina 300. In such a case, the control system 200 of the marine vessel 2000 connects to the unmanned aircraft 1000 of the marina when arriving at the marina 300. The connection between the control system 200 and the unmanned aircraft 1000 may be executed by e.g. pairing the systems with each other using a suitable pairing system, when the marine vessel arrives at the marina. As an alternative the unmanned aircraft 1000 may of course belong to the marine vessel.

In particular, the drone 1000 is configured to identify, using an image capturing unit 102 (see FIG. 2), potential mooring positions 500, 502 at the marina 300 for the marine vessel to dock. Thus, an aircraft controller 110 of the drone 1000 receives image signal(s) of the potential mooring positions 500, 502 from the image capturing unit 102.

The aircraft controller 110 can either transmit a signal indicative of an area of the mooring position 500, 502 to the control system 200 of the marine vessel 2000, whereby the marine vessel determines the specific dimensions D1, D2 of the mooring position 500, 502. As an alternative, the aircraft controller 110 can determine the dimensions/area itself and transmit the dimensions/area D1, D2 of the mooring position 500, 502 to the control system 200 of the marine vessel 2000. The signal transmitted from the aircraft controller 110 is preferably also indicative of a geographical position of the mooring position 500, 502, such as indicative e.g. of the coordinates of the mooring position 500, 502.

The control system 200 of the marine vessel 2000 thus receives the signal indicative of area at sea level of the mooring position 500, 502 from the aircraft controller 110. The control system 200 compares the dimensions D1, D2 of the mooring position 500, 502 with marine vessel specific dimensions in order to determine if the potential mooring position 500, 502 is suitable for the marine vessel, i.e. if the marine vessel 2000 will be able properly dock at the mooring position. The marine vessel specific dimensions may be e.g. the maximum length and/or maximum width of the marine vessel 2000.

If the dimensions of the mooring position 500, 502 is larger than the dimension of the marine vessel, a marine vessel navigation system 210 (see FIG. 2) controls the marine vessel 2000, either by manual operation of an operator or autonomously, to dock the marine vessel at the mooring position. The marine vessel navigation system 210 also receives the geographical position of the mooring position 500, 502 from the aircraft controller 110, thereby receiving information of where the mooring position 500, 502 is located.

In the illustrated embodiment depicted in FIG. 1, a first potential mooring position 500 has a length dimension D1 which is compared to the length of the marine vessel 2000. A second potential mooring position 502 has a width D2 which is compared to the maximum width of the marine vessel 2000. If the length of the marine vessel 2000 is larger than the length D1 of the first potential mooring position 500, while the maximum width of the marine vessel 2000 is smaller than the width D2 of the second potential mooring position 502, the marine vessel will be guided to dock at the second mooring position 502.

According to an example embodiment, once a suitable mooring position 502 has been identified, the marine navigation system is arranged to dock the marine vessel at the mooring position 502 when the marine vessel is within the predetermined distance from the mooring position. When the marine vessel 2000 is outside the predetermined distance from the mooring position 502, the operator can thus be guided towards the selected mooring position 502, where after autonomous docking can be executed when being within the predetermined distance from the mooring position 502.

The area at sea level of the mooring positions D1, D2 may be determined by using a reference object 310, 320 captured by the image capturing unit 300. The reference object 310, 320 comprises predetermined/pre-known dimensions. Hereby, using the predetermined dimensions of the reference object 310, 320, a reference image can be generated which, together with data relating to e.g. level above sea for the drone, the specific area of the mooring position can be determined. A gyro may also be used in conjunction with the elevation signal and reference image to determine the dimensions/area D1, D2 of the mooring position 500, 502.

As a non-limiting example, the reference object may be an optical marker 310 positioned on the marine vessel. As another example, the reference object may be a standardized dimension, such as the illustrated distance 320 between two streetlights positioned at ground level. A further example can be the length of the marine vessel. The reference image thus comprises data indicative of the marine vessel itself, which dimensions is known beforehand.

Figure 2:
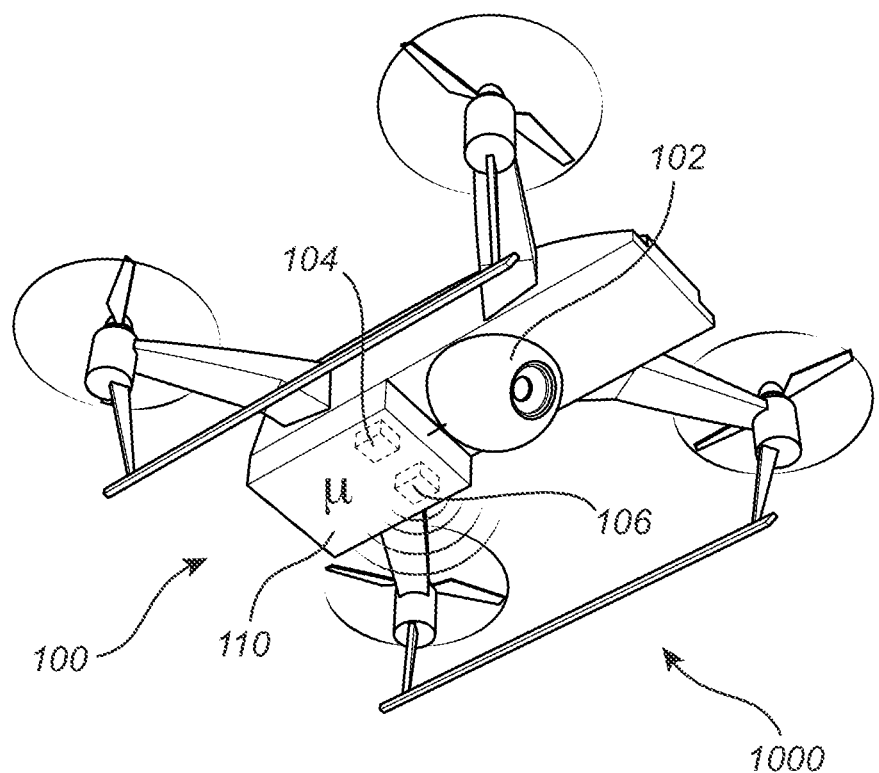
FIG. 2 is a schematic illustration of a control system arranged on the marine vessel and an unmanned aircraft system of the unmanned aircraft according to an example embodiment.
Figure 2:
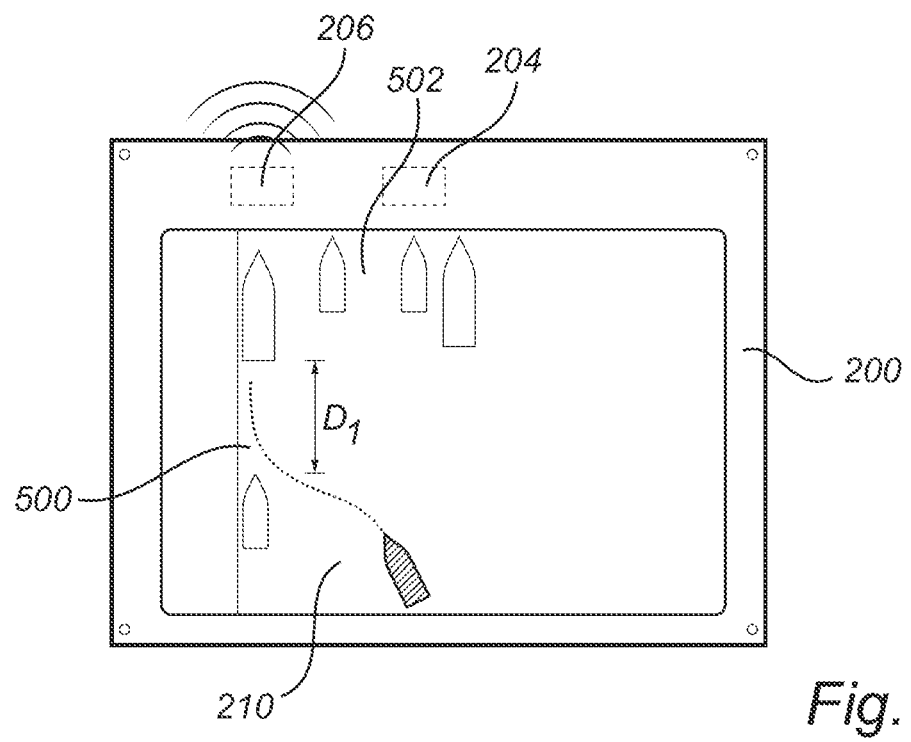

In order to describe the various systems, reference is made to FIG. 2. As can be seen, the drone 1000 comprises the unmanned aircraft system 100. The unmanned aircraft system 100 comprises the aircraft controller 110 which comprises an aircraft receiver 104 arranged to receive signals, and an aircraft transmitter 106 arranged to transmit signals. In particular, the signals are wirelessly transmitted. The unmanned aircraft system 100 further comprises an image capturing unit 102, either connected to the aircraft controller 110 by wire or arranged to wirelessly transmit image signals to the receiver of the aircraft controller 110. The image capturing unit 102 may, as a non-limiting example, be a stereo-vision camera.

The unmanned aircraft system 100 may also comprise a wind detection device (not shown) that is able to determine the current wind condition at the marina. The unmanned aircraft system 100 and/or the control system 200 of the marine vessel 2000 may hereby determine, based on the current wind condition, a suitable mooring position for the marine vessel. In detail, due to wind direction in relation to positioning of obstacles limiting the space of a mooring position a skilled captain can assess that a mooring position with suitable dimensions may be inappropriate due to hard wind at that specific position. This wind condition can be provided to one of the control systems 200, 100, where if wind is above a predetermined limit and wind direction is within a certain angle interval, in relation to obstacles limiting the space of a mooring position, the control system can then recommend not to use a certain, otherwise possible, mooring position.

Furthermore, the marine vessel comprises the above described control system 200. The control system 200 of the marine vessel 2000 comprises a receiver 204 and a transmitter 206. The transmitter 206 is thus configured to transmit signals to the aircraft receiver 104 and the receiver 204 is configured to receive signals and/or image signals from the aircraft transmitter 106.

Moreover, the control system 200 of the marine vessel 2000 further comprises a marine vessel navigation system 210. Hereby, the operator of the marine vessel 2000 can be provided with details, received from the images captured by the image capturing unit 102 of the drone 1000, of the surroundings at the marina 300. The marine vessel navigation system 210 can also indicate a suitable operation route for arriving at the selected mooring position, here indicated as the first mooring position 500. As a still further example, the marine vessel navigation system 210 can be connected to an autonomous marine vessel operation system (not shown) for autonomously operating the marine vessel to dock at the selected mooring position. Both the aircraft controller and the control system of the marine vessel may include a microprocessor, microcontroller, programmable digital signal processor or another programmable device. The aircraft controller and the control system of the marine vessel may also, or instead, include an application specific integrated circuit, a programmable gate array or programmable array logic, a programmable logic device, or a digital signal processor. Where the aircraft controller and the control system of the marine vessel include a programmable device such as the microprocessor, microcontroller or programmable digital signal processor mentioned above, the processor may further include computer executable code that controls operation of the programmable device.

Figure 3:
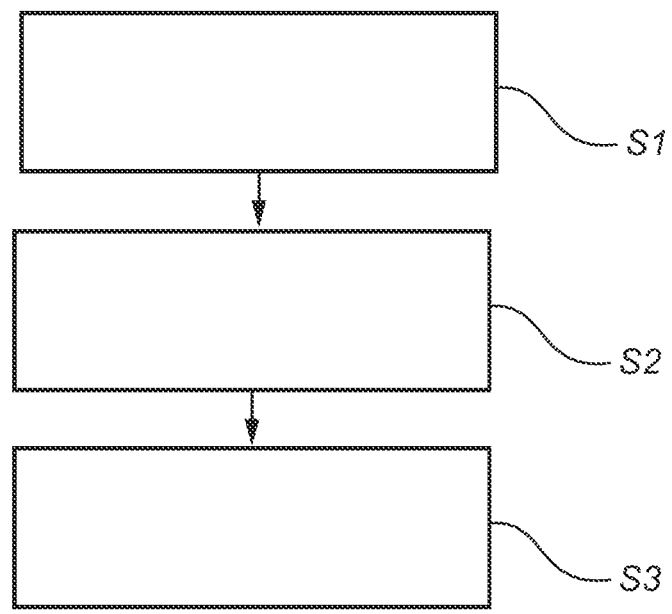
FIG. 3 is flow chart of a method for controlling a navigation system of the marine vessel in FIG. 1 according to an example embodiment.

In order to summarized, reference is made to FIG. 3 illustrating a flow chart of a method for controlling a navigation system of the above described marine vessel 2000. When the marine vessel arrives at the marina 300, or other areas for docking, an image signal from the image capturing unit 102 is obtained S1. The image signal is indicative of an area/dimensions at sea level of a potential mooring position 500, 502 for the marine vessel 2000. The area of the potential mooring position 500, 502 is compared S2 with marine vessel specific dimensions. Hence, dimensions of the marine vessel and the dimensions of the potential mooring positions are compared to each other, and when the area of the mooring position is larger than the dimension of the marine vessel, the navigation system is controlled S3 to dock the marine vessel at the mooring position. As has been described above, the navigation system can thus guide an operator of the marine vessel 2000 to the mooring position for docking, or providing autonomous docking of the marine vessel 2000.

It is to be understood that the present disclosure is not limited to the embodiments described above and illustrated in the drawings; rather, the skilled person will recognize that many changes and modifications may be made within the scope of the appended claims.

The invention claimed is:

1. An unmanned aircraft system of a drone, the unmanned aircraft system comprising an aircraft controller comprising an aircraft receiver and an aircraft transmitter, the aircraft transmitter being configured to transmit wireless signals to a receiver of a control system of a marine vessel, wherein the unmanned aircraft system further comprises an stereo-vision camera connected to the aircraft controller, and a wind detection device, the aircraft controller being configured to:
    receive an image signal from the stereo-vision camera, the image signal being indicative of a mooring position for the marine vessel;
    determine, based on the image signal, dimensions of an area of the mooring position at sea level,
    determine a current wind condition, and
    transmit a signal indicative of the dimensions of the area of the mooring position, in combination with the current wind condition, to the control system of the marine vessel.

2. The unmanned aircraft system according to claim 1, wherein the aircraft controller determines the area at sea level based on a reference image captured by the stereo-vision camera, the reference image comprises predefined dimensions.

3. The unmanned aircraft system according to claim 1, wherein the unmanned aircraft system is further configured to:
    control the unmanned aircraft to image scan a predefined area based on a signal received from the marine vessel control system; and
    identify potential mooring positions at the predefined area.

4. A control system arranged on a marine vessel, the control system being connectable to a marine vessel navigation system of the marine vessel and comprises a transmitter and a receiver, the receiver being configured to receive wireless signals from an aircraft transmitter of an unmanned aircraft system of a drone, the control system being configured to:
    obtain an image signal taken by a stereo-vision camera connected to the unmanned aircraft system, the image signal being indicative of dimensions of an area at sea level of a mooring position for the marine vessel, the signal being further indicative of a current wind condition at the unmanned aircraft system;
    compare the dimensions of the area with marine vessel specific dimensions; and
    control the marine vessel navigation system to dock the marine vessel at the mooring position when the dimensions of the area of the mooring position is larger than the dimension of the marine vessel and a wind of the current wind condition is below a predetermined limit.

5. The control system according to claim 4, wherein the control system is further configured to:
    control the marine vessel navigation system to autonomously dock the marine vessel at the mooring position when the dimensions of the area of the mooring position is larger than the dimension of the marine vessel.

6. The control system according to claim 4, wherein the marine navigation system is arranged to guide the marine vessel to dock at the mooring position when the marine vessel is within a predetermined distance from the mooring position.

7. The control system according to claim 6, wherein the marine navigation system is arranged to dock the marine vessel when the marine vessel is within the predetermined distance from the mooring position.

8. The control system according to claim 6, wherein the marine navigation system is arranged to guide an operator of the marine vessel in a direction towards the mooring position when the marine vessel is outside the predetermined distance from the mooring position.

9. The control system according to claim 4, wherein the control system is further configured to transmit navigation signals to the unmanned aircraft system, the navigation signals being indicative of a desirable navigation of the unmanned aircraft system.

10. A method for controlling a navigation system of a marine vessel, the navigation system being wirelessly connected to an unmanned aircraft system comprising a stereo-vision camera and wind detection device, the method comprising:

obtaining an image signal from the stereo-vision camera of drone, the image signal being indicative of dimensions of an area at sea level of a mooring position for the marine vessel;

comparing the dimensions of the area at sea level with marine vessel specific dimensions;

determine a current wind condition at the unmanned aircraft system, and controlling the navigation system to dock the marine vessel at the mooring position when the dimensions of the area of the mooring position is larger than the dimension of the marine vessel and a wind of the current wind condition is below a predetermined limit.

11. A non-transitory computer readable medium carrying a computer program comprising program code for performing the steps of claim 10 when the program code is run on a computer.

* * * * *